United States Patent
Won et al.

(10) Patent No.: US 11,614,038 B2
(45) Date of Patent: Mar. 28, 2023

(54) CONTROL METHOD OF SECURING CVVD STARTABILITY AND CVVD SYSTEM THEREFOR

(71) Applicants: Hyundai Motor Company, Seoul (KR); Kia Motors Corporation, Seoul (KR)

(72) Inventors: Min-Kyu Won, Hwaseong-si (KR); Chung-Hun Ha, Suwon-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 171 days.

(21) Appl. No.: 16/857,575

(22) Filed: Apr. 24, 2020

(65) Prior Publication Data

US 2021/0115820 A1    Apr. 22, 2021

(30) Foreign Application Priority Data

Oct. 21, 2019   (KR) .................. 10-2019-0130830

(51) Int. Cl.
| | |
|---|---|
| F02D 13/02 | (2006.01) |
| F01L 13/00 | (2006.01) |
| F02D 41/14 | (2006.01) |
| F02D 41/02 | (2006.01) |
| F02D 41/06 | (2006.01) |
| F02D 41/00 | (2006.01) |
| F02D 41/22 | (2006.01) |

(52) U.S. Cl.
CPC ...... *F02D 13/0207* (2013.01); *F01L 13/0015* (2013.01); *F02D 41/0002* (2013.01); *F02D 41/0255* (2013.01); *F02D 41/062* (2013.01); *F02D 41/064* (2013.01); *F02D 41/1486* (2013.01); *F02D 41/22* (2013.01); *F01L 2013/103* (2013.01); *F01L 2800/01* (2013.01); *F02D 2041/001* (2013.01)

(58) Field of Classification Search
None
See application file for complete search history.

(56) References Cited

U.S. PATENT DOCUMENTS

| | | | | |
|---|---|---|---|---|
| 6,491,022 | B2* | 12/2002 | Okamoto | F02D 41/10 123/396 |
| 10,174,684 | B2* | 1/2019 | Kim | F01L 1/3442 |
| 2005/0205069 | A1* | 9/2005 | Lewis | F01L 1/38 123/491 |
| 2009/0007564 | A1* | 1/2009 | Suzuki | F02D 13/0269 60/602 |
| 2019/0017457 | A1* | 1/2019 | Fujimoto | F02D 41/0002 |

FOREIGN PATENT DOCUMENTS

JP    2013167223 A    8/2013

* cited by examiner

*Primary Examiner* — Kenneth J Hansen
*Assistant Examiner* — Wesley G Harris
(74) *Attorney, Agent, or Firm* — Slater Matsil, LLP

(57) ABSTRACT

A control method can be used for securing continuously variable valve duration (CVVD) startability when a CVVD error is recognized by a CVVD controller during an operation of a CVVD system. The control method includes performing engine startability securing control for solving the CVVD error by applying a starting air volume to starting of an engine through at least one of a valve position fixing value, a valve position threshold, or an immediately previous valve position value.

14 Claims, 8 Drawing Sheets

FIG.2

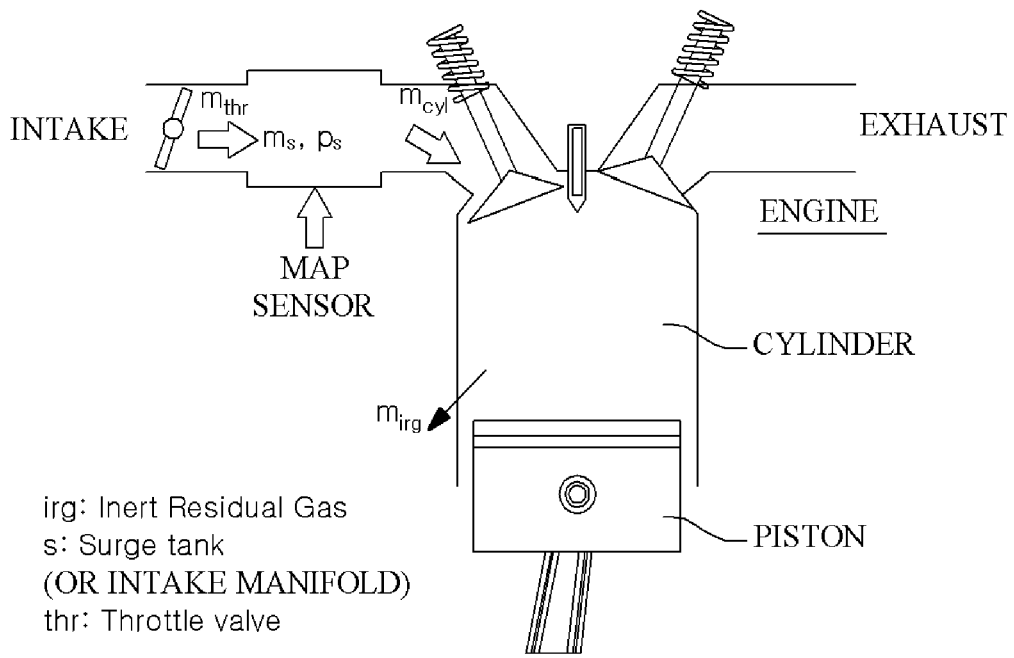

irg: Inert Residual Gas
s: Surge tank
(OR INTAKE MANIFOLD)
thr: Throttle valve $$Chrg\_Ld = \frac{m - m_{irg}}{m_{norm}} = \frac{\frac{P_S V_H}{RT_0} \times \frac{1}{n_{cyl}} - \frac{P_{irg} V_H}{RT_{irg}} \times \frac{1}{n_{cyl}}}{\frac{P_0 V_H}{RT_0} \times \frac{1}{n_{cyl}}}$$

$$Chrg\_Ld = \frac{m - m_{irg}}{m_{norm}} = \frac{\frac{P_S V_H}{RT_0} \times \frac{1}{n_{cyl}} - \frac{P_{irg} V_H}{RT_{irg}} \times \frac{1}{n_{cyl}}}{\frac{P_0 V_H}{RT_0} \times \frac{1}{n_{cyl}}} = \frac{T_0}{T_S P_0}(P_S - P_{irg})$$

$$Chrg\_Ld = Chrg\_kP2L \times (P_S - P_{irg})$$

CONTROL METHOD OF SECURING CVVD STARTABILITY AND CVVD SYSTEM THEREFOR

CROSS-REFERENCE TO RELATED APPLICATIONS

This application claims priority to Korean Patent Application No. 10-2019-0130830, filed on Oct. 21, 2019, which application is hereby incorporated herein by reference.

TECHNICAL FIELD

The present disclosure relates to a control method for securing continuously variable valve duration (CVVD) startability.

BACKGROUND

Generally, the existing valve train technology widely applied to a vehicle can take advantage of a characteristic of engine combustion by adjusting a timing of a valve to control an opening (closing) timing of an intake (exhaust) valve. However, in fully taking advantage of a combustion characteristic of an engine, the existing valve train technology has a limit in that the opening timing and the closing timing are dependent on each other.

For example, retarding of the intake valve can fully take advantage of an overlap between the intake valve and the exhaust valve, but a loss of performance is inevitable. On the other hand, the advancing of the intake valve can improve the performance, but degradation in fuel efficiency is inevitable. Consequently, the existing valve train technology has difficulty in solving a trade-off limit between the fuel efficiency and the performance of the engine.

Meanwhile, technology of a continuously variable valve duration (CVVD) system, which is newly applied as gasoline engine valve train technology, is designed to independently control an opening timing and a closing timing of an intake (exhaust) valve by varying a duration of the intake (exhaust) valve. Thus, an optimum duration is applied to each operating area of an engine such that an advantage of each operating area can be fully utilized. Therefore, the technology of the CVVD system is suggested as a solution to a trade-off limit between fuel efficiency and performance of the engine.

This is because, unlike the existing valve train technology which is a conventional sensor method of recognizing a distal end of a valve, the CVVD system counts and uses a value of a Hall sensor in a brushless direct current (BLDC) motor so as to calculate a position of a valve such that a position of the distal end can be inferred on the basis of information on a start point moving an intake (exhaust) valve.

However, a distal end position inference method using the information on the start point of the valve movement, which is applied to the CVVD system, has a limit in that the information is valid only on the premise that there is no breakage or damage to a CVVD actuator (e.g., a motor) and CVVD mechanism.

Consequently, when the CVVD actuator and the CVVD mechanism fail, it is very important for the CVVD system to establish control strategies for how to define a valve default position using which method and how to calculate air volume.

For example, in a situation in which controller area network (CAN) communication is disconnected or information of the Hall sensor is missed, the CVVD system has difficulty exchanging information with an electronic control unit (ECU) (e.g., a CVVD controller and an engine controller) and thus valve movement becomes impossible such that the CVVD actuator is stopped. Unlike a short duration position, when the CVVD actuator is stopped, a stop of the intake (exhaust) valve at a long duration position causes degradation in startability during the next starting that is subsequently attempted.

In particular, the causing of the degradation in startability may continue cranking during starting, and, in severe cases, the starting may not be performed at all.

Therefore, in problematic situations such as abnormality of the CAN communication which may occur in the CVVD system, and the stop of the CVVD actuator which may occur due to a cause including data missing, there is a need for establishing a control strategy of a CVVD system that allows a driver to move a vehicle to a safe location (e.g., a garage) by defining a valve default position and calculating air volume.

SUMMARY

The present disclosure relates to a control method for securing continuously variable valve duration (CVVD) startability. Particular embodiments relate to a CVVD system that allows a driver to safely move a vehicle without a starting problem of the vehicle even in a CVVD failure situation including abnormality of controller area network (CAN) communication.

An embodiment of the present disclosure is directed to a control method of securing continuously variable valve duration (CVVD) startability and a CVVD system therefor, which are capable of maintaining engine startability by increasing a starting fuel amount according to an arbitrary setting value of a valve duration or correcting the starting fuel amount according to a duration criterion of a valve based on stability of engine starting, and, particularly, which are capable of providing vehicle mobility for an emergency response of a driver by providing startability with respect to next starting in a problematic situation of valve movement due to a CVVD actuator failure which occurs due to a CVVD error including abnormality of controller area network (CAN) communication between systems.

Other objects and advantages of the present disclosure can be understood by the following description and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, there is provided a control method of securing continuously variable valve duration (CVVD) startability, the control method including, when a CVVD error is recognized by a CVVD controller during an operation of a CVVD system, engine startability securing control for solving the CVVD error by applying a starting air volume and a starting fuel amount to starting of an engine through at least one of a valve position fixing value, a valve position threshold, and an immediately previous valve position value.

As an exemplary embodiment, the engine startability securing control may be divided into valve position fixing value control using the valve position fixing value, valve position threshold control using the valve position threshold, and immediately previous valve position value control using the immediately previous valve position value.

As an exemplary embodiment, the valve position fixing value may be a limp-home value of a valve position, the valve position threshold may be a valve duration value not exceeding a predetermined value, and the immediately previous valve position value may be a valve duration value which is not out of a valve failure timing value or more.

As an exemplary embodiment, the valve position fixing value control may include determining an application condition with respect to the valve position fixing value through whether possibility of valve position recognition and valve movement is detected, setting the valve position fixing value to a valve duration fixing value when the valve position recognition is impossible and the valve movement is impossible, and calculating the starting air volume and the starting fuel amount as the valve duration fixing value.

As an exemplary embodiment, in the valve position fixing value control, when the valve position recognition is possible, the CVVD error may be solved through the valve duration value on the basis of a current valve position. When the valve movement is possible, the CVVD error may be solved through a valve short duration value obtained at a position of a valve moved by a motor in a short direction.

As an exemplary embodiment, the valve position threshold control may include determining an application condition with respect to the valve position threshold through whether application possibility of valve position recognition, valve movement, and the valve position threshold of a valve is detected, setting the valve position threshold as the valve duration threshold when the application of the valve position recognition, the valve movement, and the valve position threshold is impossible, and calculating the starting air volume and the starting fuel amount as the valve duration threshold.

As an exemplary embodiment, in the valve position threshold control, when the valve position recognition is possible, the CVVD error may be solved through the valve duration value on the basis of a current valve position, and when the valve movement is possible, the CVVD error may be solved through a valve short duration value obtained at a position of a valve moved by a motor in a short direction, and when the application of the valve position threshold is possible, the CVVD error may be solved through a valve duration threshold which is set to be smaller than a valve duration value of a valve position immediately before a failure.

As an exemplary embodiment, the immediately previous valve position value control may include determining an application condition with respect to an immediately previous value through whether possibility of valve position recognition and valve movement is detected, setting the immediately previous value to an immediately previous valve duration value when the valve position recognition is impossible and the valve movement is impossible, and calculating the starting air volume as the immediately previous valve duration value and calculating the starting fuel amount as a starting fuel correction amount for next starting on the basis of the immediately previous valve duration value.

As an exemplary embodiment, in the immediately previous valve position value control, when the valve position recognition is possible, the CVVD error may be solved through the valve duration value on the basis of a current valve position, and when the valve movement is possible, the CVVD error may be solved through a valve short duration value obtained at a position of a valve moved by a motor in a short direction.

In accordance with another embodiment of the present disclosure, there is provided a continuously variable valve duration (CVVD) system including a CVVD controller configured to apply a starting air volume and a starting fuel amount by at least one of a valve position fixing value, a valve position threshold, and an immediately previous valve position value as a cylinder charging amount required for engine starting with respect to a CVVD error including at least one of abnormality of controller area network (CAN) communication, a stuck valve, and a motor failure which are generated when CVVD control is performed.

As an exemplary embodiment, the CVVD controller may include a cylinder charging amount map which matches a duration value of a valve to the cylinder charging amount, a valve position map which matches the valve position fixing value, the valve position threshold, and the immediately previous valve position value, and a fuel amount map which matches a starting fuel amount to the starting air volume.

As an exemplary embodiment, the CVVD controller may recognize an air flow rate of an intake line through a measured mass air flow (MAF) rate value which is detected by an MAF sensor provided in the intake line configured to deliver the air flow rate to a combustion chamber.

As an exemplary embodiment, the CVVD controller may be connected to a continuously variable valve timing (CWT) system configured to directly control a camshaft.

BRIEF DESCRIPTION OF THE DRAWINGS

FIG. 2 is a diagram showing an example of a fuel amount calculation basis for securing the CVVD startability according to embodiments of the present disclosure.

DETAILED DESCRIPTION OF ILLUSTRATIVE EMBODIMENTS

Exemplary embodiments of the present disclosure will be described below in more detail with reference to the accompanying drawings, and these embodiments are examples of the present disclosure and may be embodied in various other different forms by those skilled in the art to which the present disclosure pertains so that the present disclosure is not limited to these embodiments.

Figure 1:
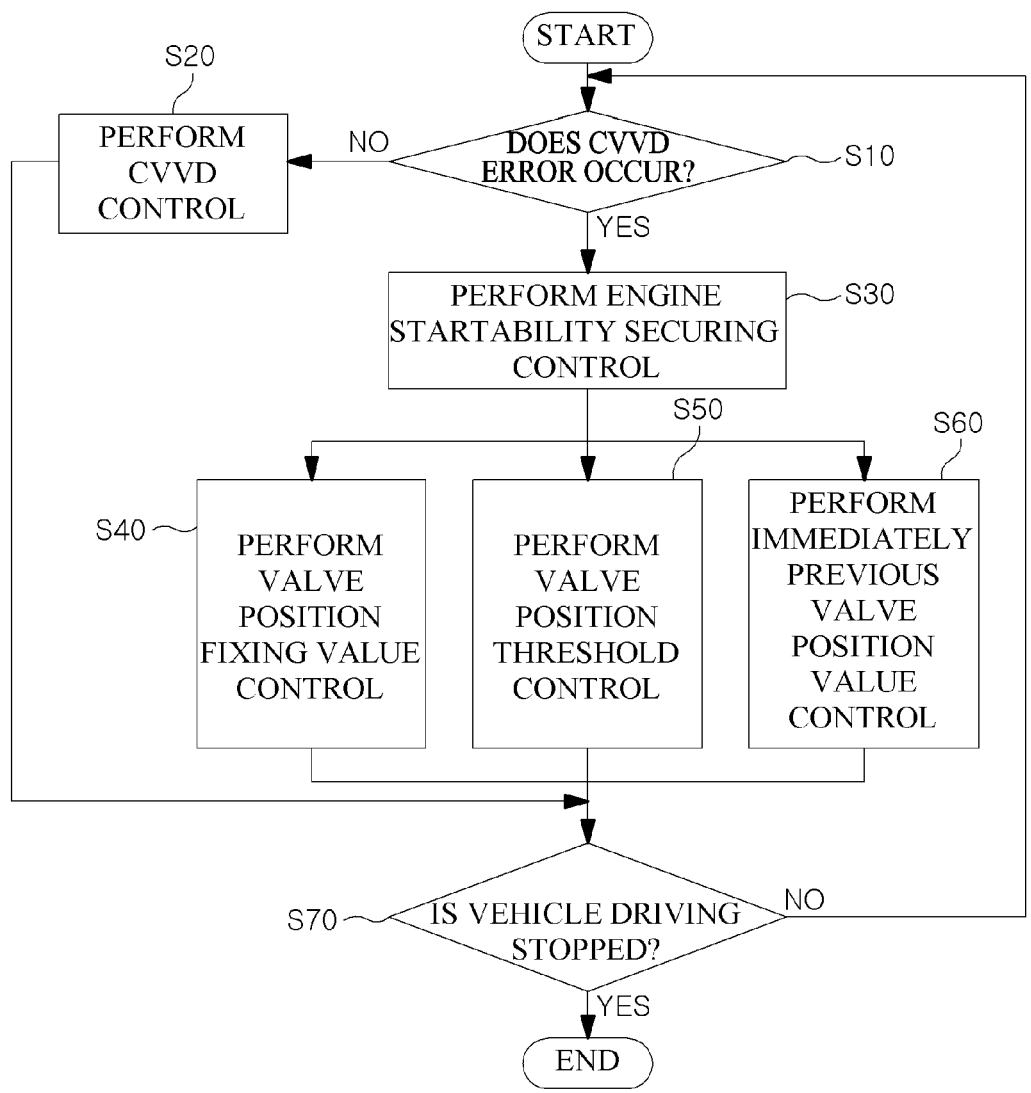
FIG. 1 is a flowchart illustrating a control method of securing continuously variable valve duration (CVVD) startability according to embodiments of the present disclosure.

Referring to FIG. 1, when a continuously variable valve duration (CVVD) error, which makes it difficult to execute CVVD control (S20), is determined as occurring (S10), a control method of securing CVVD startability switches to engine startability securing control (S30) to perform vehicle driving utilizing a CVVD system such that a starting fuel amount may be secured in a failure situation regardless of a valve fixing position according to the occurrence of the CVVD error (S10).

When the CVVD error is determined as occurring (S10), FIG. 2 illustrates a basic principle for a fuel amount in which engine startability is improved through the engine startability securing control (S30).

As shown in the drawing, a cylinder charging amount Chrg_Ld is modeled on the basis of a pressure value Ps of an intake manifold and a cylinder volume VH at a timing when an intake valve is closed. In this case, when the intake valve is closed with the same valve timing in a section in which a piston is raised during engine starting, the cylinder charging amount Chrg_Ld represents that, since a duration is different, a cylinder volume VH in a short duration is calculated to be large, whereas, a cylinder volume VH in a long duration is calculated to be small.

Therefore, when a valve is fixed to the long duration in a valve failure situation due to the occurrence of the CVVD error (S10), the cylinder charging amount Chrg_Ld becomes smaller to the cylinder volume VH which is calculated to be smaller than that in the short duration so that it can be seen that the fuel amount determined on the basis of the cylinder charging amount Chrg_Ld is also basically reduced such that engine startability is degraded. Simultaneously, it can be seen that, even when the valve is fixed to the long duration, the cylinder charging amount Chrg_Ld is calculated as a predetermined amount or more such that an effect of securing the fuel amount and improving the engine startability can be achieved.

Referring to FIG. 1 again, the engine startability securing control (S30) is divided into performing valve position fixing value control (S40) using a limp-home value of a valve position, performing valve position threshold control (S50) using a threshold of the valve position, and performing immediately previous valve position value control (S60). The cylinder charging amount Chrg_Ld is calculated as the predetermined amount or more through the above control such that the fuel amount is secured. Thereafter, it is determined whether vehicle driving is stopped (S70). If yes, the method ends. If no, the method returns to determining whether a CVVD error occurs (S10).

Consequently, when the CVVD error is determined as occurring (S10), the control method of securing CVVD startability successfully implements starting of the engine such that it is possible to prevent engine malfunction and engine knocking which may occur due to lack of air, prevent a risk of a secondary accident risk due to continuous driving, reduce costs due to vehicle towing or after service (AS), improve customer satisfaction, and significantly improve marketability of a vehicle.

Figure 3:
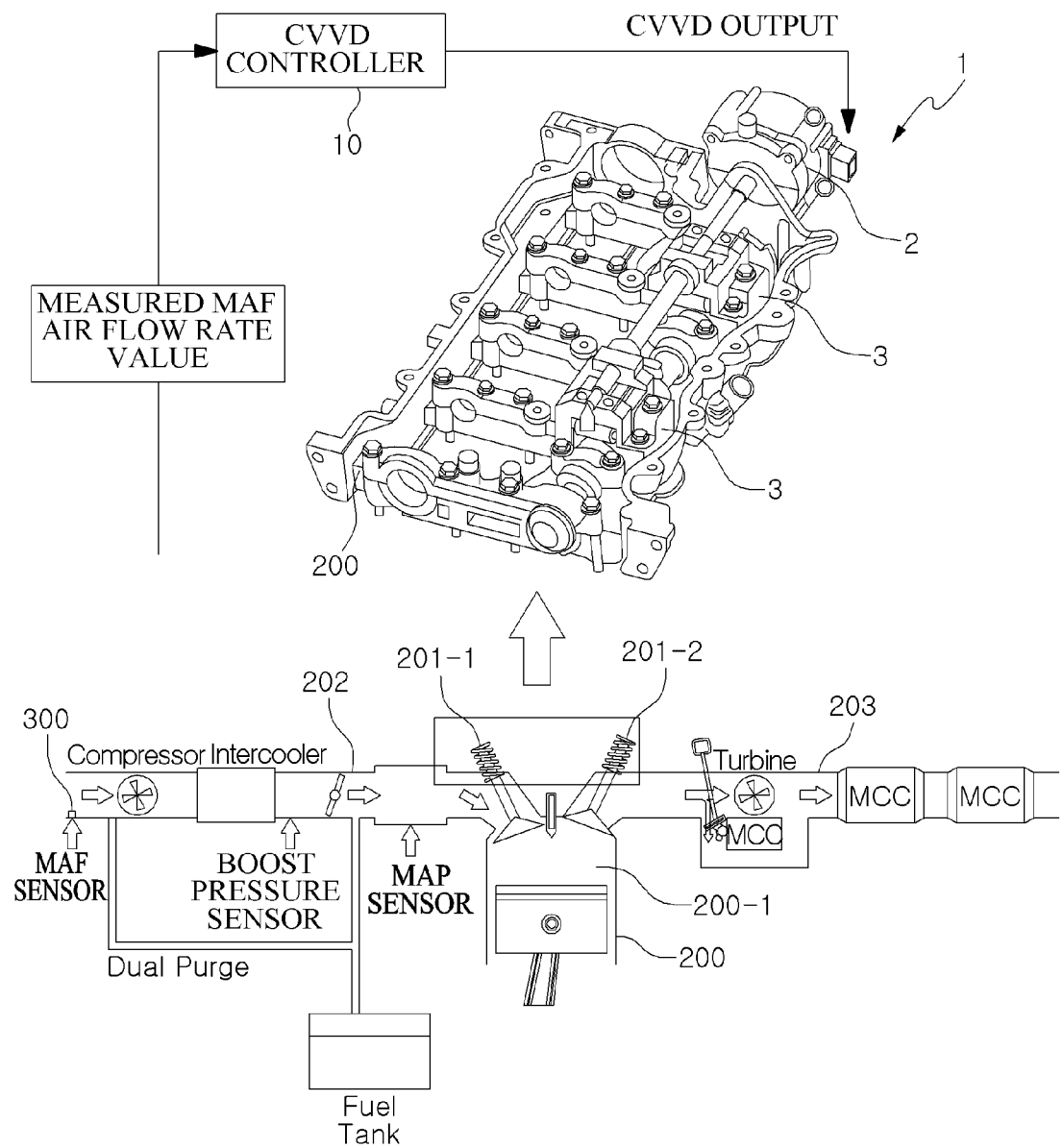
FIG. 3 is a diagram illustrating an example of a CVVD system for implementing CVVD startability securing control according to embodiments of the present disclosure.
Figure 4:
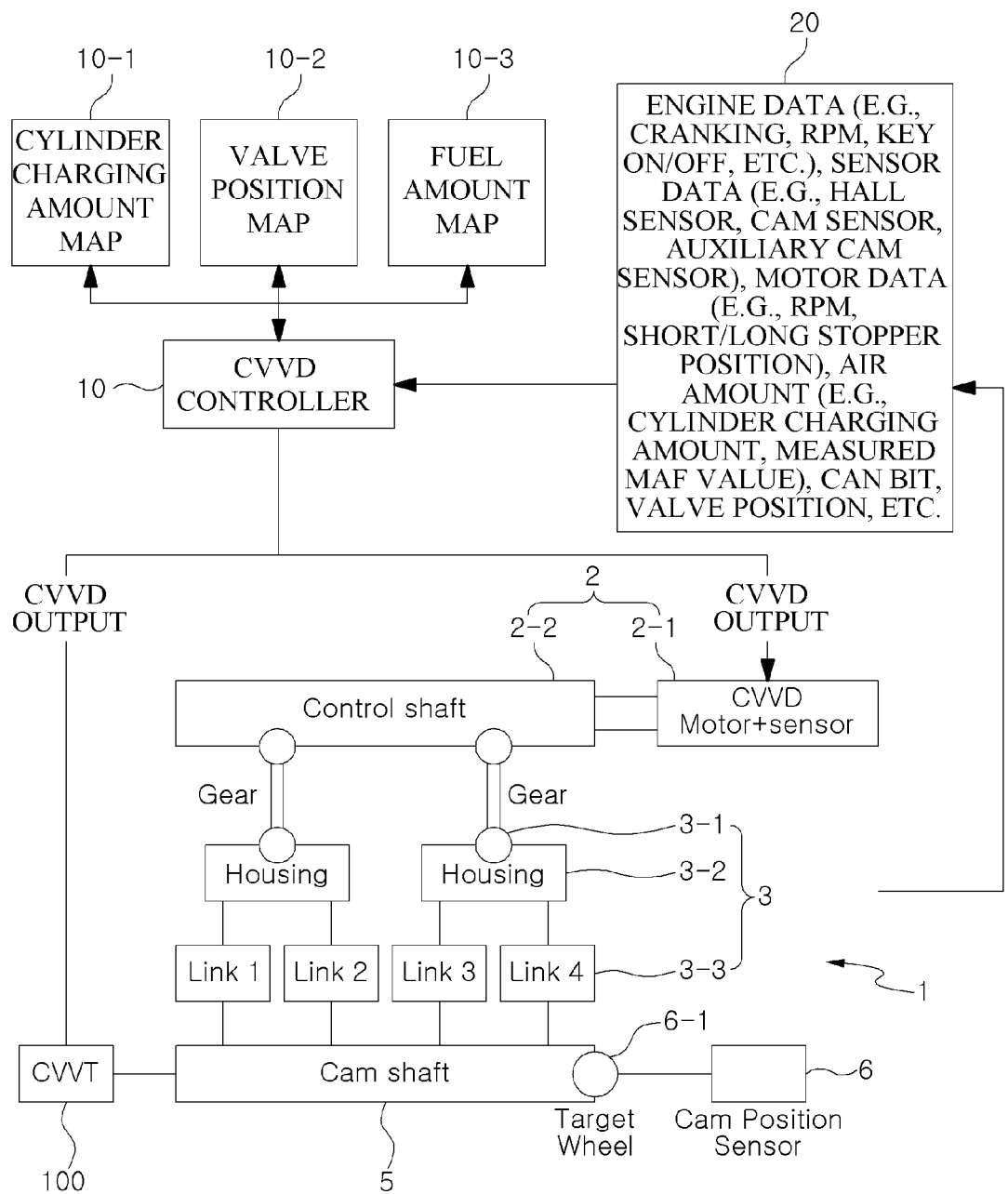
FIG. 4 is a diagram illustrating an example of a CVVD system to which the CVVD startability securing control according to embodiments of the present disclosure is applied.

Meanwhile, FIGS. 3 and 4 illustrate an example of a CVVD system 1 applied to an engine in which engine startability is improved by securing a starting air volume due to the engine startability securing control (S30) of the control method of securing CVVD startability.

Referring to FIG. 3, the CVVD system 1 is assembled to an engine 200 and linked to a CVVD controller 10 which receives a plurality of pieces of detection information including input data of a mass air flow (MAF) rate, a communication bit, and a valve position value as input data.

For example, the engine 200 includes a combustion chamber 200-1 formed in a cylinder block, the combustion chamber 200-1 includes an intake valve 201-1 and an exhaust valve 201-2 in which valve duration control is performed by the CVVD controller 10, the intake valve 201-1 communicates an intake line 202 with the combustion chamber 200-1 to introduce an air flow rate of the intake line 202 into the combustion chamber 200-1, and the exhaust valve 201-2 communicates an exhaust line 203 with the combustion chamber 200-1 to exhaust an exhaust gas of the combustion chamber 200-1 to the exhaust line 203. Further, the engine 200 includes an MAF sensor 300, and the MAF sensor 300 is installed in the intake line 202 to detect the air flow rate introduced into the combustion chamber 200-1 as a measured MAF sensor flow rate value.

For example, the CVVD system 1 includes a CVVD actuator 2, a CVVD mechanism unit 3, and a cam sensor 6 (or a cam position sensor 6). The CVVD controller 10 receives the measured MAF sensor flow rate value as sensed air volume data and controls the CVVD actuator 2 of the CVVD controller 10.

Therefore, the CVVD system 1 and the engine 200 are examples for implementing a typical CVVD control in a vehicle.

FIG. 4 illustrates an example in which the CVVD controller 10 implements the engine startability securing control (S30) with respect to the CVVD system 1 using at least one of or any one among the valve position fixing value control (S40), the valve position threshold control (S50), and the immediately previous valve position value control (S60) and is linked to a continuously variable valve timing (CVVT) system 100.

Specifically, the CVVD system 1 includes the CVVD actuator 2 constituted of a three-phase type brushless direct current (BLDC) motor 2-1 and a control shaft 2-2 linked to a camshaft 5 and rotated by the motor 2-1, the CVVD mechanism unit 3 constituted of a gear 3-1 linked to the control shaft 2-2, a housing 3-2 which forms an external appearance surrounding the gear 3-1, and a link 3-3 linked to a cam of the camshaft 5 for controlling opening or closing of the intake valve 201-1 and an exhaust valve 201-2, and the cam sensor 6 located at an end portion of camshaft 5.

In particular, the control shaft 2-2 is operated to check reaching of a position of the short/long duration with respect to a rotation of the motor 2-1 as a physical contact using a stopper provided at a distal end portion of the control shaft 2-2. The cam sensor 6 detects a rotation angle of the camshaft 5 by recognizing a protrusion of a target wheel 6-1 formed on a circumference of the camshaft 5.

Specifically, the CVVT system 100 is controlled by a CVVT output of the CVVD controller 10 so as to allow valve opening and closing timings to be simultaneously varied in a state in which the short and long durations are fixed, thereby directly operating the camshaft 5. Therefore, the CVVT system 100 controls an overlap timing by adjusting the opening and closing timings of the valve (e.g., an intake valve open (IVO) and an intake valve close (IVC)) and opening and closing amounts thereof according to a rotation area of the engine, thereby performing control of a cylinder charging amount and a residual gas volume. In particular, the CVVT system 100 is independently mounted in the engine 200 instead of being linked to the CVVD system 1 such that the CVVD system 1 may also be independently mounted in the engine 200 instead of being linked to the CVVT system 100.

Specifically, the CVVD controller 10 generates a CVVD output for the motor 2-1 of the CVVD actuator 2 in conjunction with a cylinder charging amount map 10-1, a valve position map 10-2, and a fuel amount map 10-3 and receives measured values, which are detected by the MAF sensor 300 together with various sensors installed in the engine 200 and the vehicle, as input data in conjunction with the data input device 20.

For example, the cylinder charging amount map 10-1 provides a mapping value with respect to a cylinder charging amount of a long duration that is smaller than a short duration on the basis of the cylinder charging amount Chrg_Ld (see FIG. 2). In order to provide startability for the next starting in a problematic situation of valve movement according to a CVVD actuator failure occurring due to a CVVD error including abnormality of CAN communication between systems, the valve position map 10-2 matches a valve position fixing value (e.g., a limp-home value), a valve position threshold, and an immediately previous valve position value such that a starting fuel amount is calculated and secured by a predetermined amount or more from the cylinder charging amount Chrg_Ld (see FIG. 2). The fuel amount map 10-3 provides the starting fuel amount by performing matching, calculation, or correction on a starting air volume which is calculated by applying the valve position fixing value (e.g., a limp-home value), the valve position threshold, and the immediately previous valve position value.

In particular, the cylinder charging amount map 10-1 includes matching of a measured MAF sensor flow rate value of the MAF sensor 300 as a basic logic. The valve position map 10-2 includes valve duration matching due to a deviation between measured MAF sensor flow rate values of the MAF sensor 300 as a basic logic.

For example, the data input device 20 detects engine data including a vehicle speed, an opening degree of an accelerator pedal, a battery voltage, a cooling water temperature/intake temperature range, and the like together with engine cranking (a rotation state of a crankshaft by a starter motor), an engine revolution per minute (RPM), and a key ON/OFF (ignition) and detects a motor RPM, a rotation angle of a control shaft, short/long duration positions, stuck valve/gear/motor, intake/exhaust valve lifts, a measured cam sensor value, a measured MAF sensor flow rate value, a CAN bit, and a valve position value as CVVD data. Therefore, the data processor 20 may be an engine electronic control unit (ECU).

Hereinafter, the control method of securing CVVD startability of FIG. 1 will be described in detail with reference to FIGS. 3 to 8. In this case, a control main body is the CVVD controller 10, and control targets are the CVVD system 1, the engine 200, and an engine system including the CVVD system 1 and the engine 200.

Referring to FIG. 1, in the determination of the occurrence of the CVVD error (S10), the CVVD controller 10 determines the CVVD control (S20) and the engine startability securing control (S30).

Referring to FIGS. 3 and 4, the CVVD controller 10 checks one or more among the measured MAF sensor flow rate value, the motor RPM, the rotation angle of the control shaft, the short/long duration positions, the stuck gear, the intake/exhaust valve lifts, the measured cam sensor value, the CAN bit, and the valve position value of the CVVD data with an engine data provided from the data input device 20, thereby checking a CVVD operating state of the CVVD system 1 together with an air volume supplied to the combustion chamber 200-1 of the engine 200.

Thus, when the CVVD actuator 2 fails in a problematic situation of CVVD hardware due to other causes including abnormality of the CAN communication between the systems (e.g., the CVVD controller 10 and an engine controller), the CVVD error is determined as occurring (S10). As a result, when the CVVD error is determined as not occurring (S10), the CVVD controller 10 determines the CVVD system 1 as being in a normal operating state and switches to the CVVD control (S20).

Therefore, the CVVD control (S20) provides an accurate air volume calculated by an air volume calculation using the valve start point position in the CVVD controller 10 such that the CVVD system 1 operates to prevent malfunction, knocking, and starting off in the engine 200. Consequently, the CVVD control S20 means that the existing CVVD control method, logic, or program checks and controls the short/long durations of the valve normally.

Meanwhile, when the CVVD error is determined as occurring (S10), the CVVD controller 10 determines a situation in which the valve (e.g., the exhaust valve) cannot be moved, a situation in which a current valve position cannot be known, and a situation in which engine starting is turned off (engine off) and then the engine starting (engine on) is attempted again as a valve problem due to a failure of CVVD actuator 2 to execute the engine startability securing control (S30) such that startability for the next starting may be stably provided.

To this end, the CVVD controller 10 divides the engine startability securing control (S30) into the valve position fixing value control (S40) using a limp-home value of a valve position, the valve position threshold control (S50) using a threshold of the valve position, and the immediately previous valve position value control (S60). The CVVD controller 10 controls the CVVD system 1 using any one selected from these controls S40, S50, and S60 to supply a starting air volume required for starting of the engine 200 such that the vehicle driving is performed.

Hereinafter, a failure in which a current position of the valve is impossible to be recognized or valve movement is impossible will be described by including the CVVD system 1 to which a BLDC motor is applied and in which a Hall sensor failure, a controller internal error, a CAN communication failure, and the like are set as that the CVVD error is determined as occurring (S10), or the CVVD system 1 to which a DC motor is applied and in which occurrence of a feedback sensor failure together with a stuck valve, removal of a power line together with a communication line, and the like are set as that the CVVD error is determined as occurring (S10).

Meanwhile, a starting fuel amount correction may employ a constant fuel amount correction in which, when starting is turned off, a valve is moved to a position in favor of starting without a separate correction under non-occurrence of a failure on the basis of a valve duration during starting, or a fuel amount correction using a default position which is moved through hardware such as a return spring and the like in favor of starting when a motor fails. However, the starting fuel amount correction will be described to be performed together with a starting air volume calculation according to the occurrence of the CVVD error (S10).

Subsequently, referring to FIGS. 5 to 7, the CVVD controller 10 specifies the engine startability securing control (S30) into the valve position fixing value control (S40) of FIG. 5, the valve position threshold control (S50) of FIG. 6, and the immediately previous valve position value control (S60) of FIG. 7.

Further, referring to FIGS. 3 and 4, in order to specifically perform the valve position fixing value control (S40), the valve position threshold control (S50), and the immediately previous valve position value control (S60), the CVVD controller 10 matches the input data of the data input device 20 to the cylinder charging amount map 10-1, the valve position map 10-2, and the fuel amount map 10-3 to finally calculate the starting air volume which improves startability. In this case, the input data of the data input device 20 includes the measured MAF sensor flow rate value, the motor RPM, the rotation angle of the control shaft, the short/long duration positions, the stuck gear, the intake/exhaust valve lifts, the measured cam sensor value, the CAN bit, and the valve position value.

Figure 5:
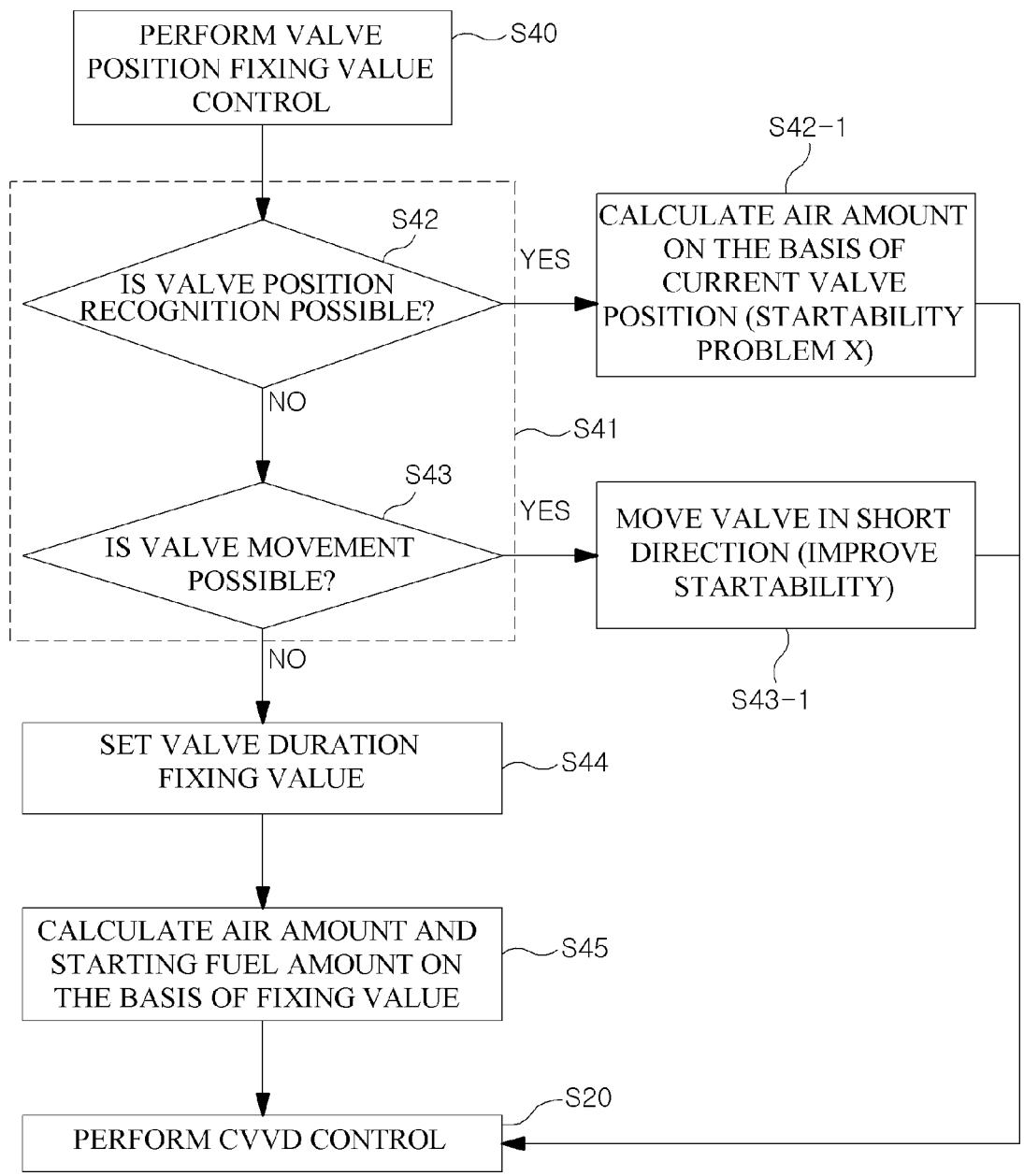
FIG. 5 is a flowchart illustrating valve position fixing value control for the CVVD startability securing control according to embodiments of the present disclosure.

Referring to FIG. 5, when a valve fails according to the occurrence of the CVVD error (S10), the valve position fixing value control (S40) defines a fixed value with respect to a limp-home value in which the valve duration has no connection with positions of the short/long durations and models a starting air volume on the basis of a valve duration fixing value to map the modeled starting air volume to an air volume value of a level not affecting startability such that the startability is improved.

To this end, the CVVD controller 10 performs the valve position fixing value control (S40) as a fixed value application condition determination (S41), a valve duration fixing value setting (S44), and a fixing value-based cylinder charging amount calculation (S45).

Specifically, the fixed value application condition determination (S41) includes a communication state checking (S42) and a motor state checking (S43).

For example, the communication state checking (S42) checks whether abnormality of CAN communication, which is exhibited as a missing Hall sensor count, is present such that whether valve position recognition is possible is checked.

As a result, when the valve position recognition is possible, since the occurrence of the CVVD error (S10) is not abnormality of CAN communication or a Hall sensor failure, the CVVD controller 10 executes a current valve position reference application (S42-1) to perform the CVVD control (S20) by calculating an air volume using a current valve position reference which does not cause a startability problem. Otherwise, when the valve position recognition is impossible, since the occurrence of the CVVD error (S10) is the abnormality of the CAN communication or the Hall sensor failure, the CVVD controller 10 switches to the motor state checking (S43).

For example, the motor state checking (S43) checks possibility of valve movement through whether a motor is stuck, thereby determining whether the valve movement is possible even in a state in which the valve position recognition is impossible.

As a result, when the valve movement is possible, since the occurrence of the CVVD error (S10) is the abnormality of the CAN communication or the Hall sensor failure but is not a motor failure, the CVVD controller 10 executes a valve short direction movement (S43-1) to operate the control shaft 2-2 using the motor 2-1 so as to forcibly move the valve position in a direction of the short duration in favor of improving startability and then performs the CVVD control (S20) by calculating an air amount that the forcedly moved short duration is determined as a 0% duration.

Otherwise, when the valve movement is impossible, since the occurrence of the CVVD error (S10) is the abnormality of the CAN communication or the Hall sensor failure and, simultaneously, is the motor failure, the CVVD controller 10 switches to the valve duration fixing value setting (S44) and the fixing value-based cylinder charging amount calculation (S45).

Specifically, owing to the occurrence of the CVVD error (S10) in which the valve position recognition is impossible and the valve movement is impossible, the valve duration fixing value setting (S44) applies an arbitrary value based on a fixed value, which is capable of securing startability and combustion stability apart from the short/long durations on the basis of a sensing count of the Hall sensor, to the valve duration and sets the arbitrary value as the valve duration fixing value.

Further, the fixing value-based cylinder charging amount calculation (S45) calculates a starting air volume and a starting fuel amount on the basis of the set valve duration fixing value and applies the calculated starting air volume and the calculated starting fuel amount to an engine starting request, thereby performing the CVVD control (S20). In this case, since the cylinder charging amount Chrg_Ld (see FIG. 2) is used in the calculation of the starting air volume and the starting fuel amount, the above calculation process is the same as the existing calculation process of the starting air volume and the starting fuel amount on the basis of the short/long durations.

Figure 6:
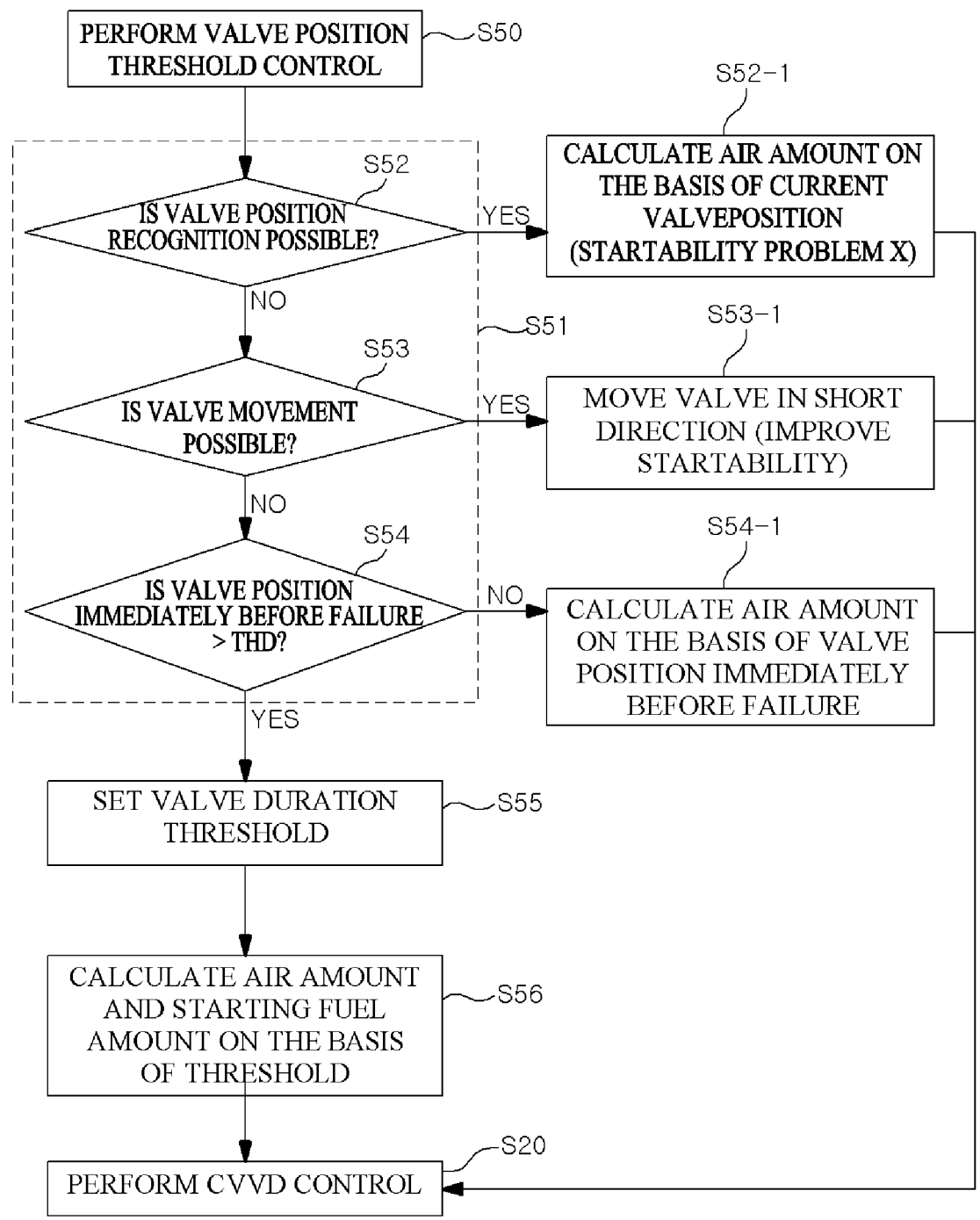
FIG. 6 is a flowchart illustrating valve position threshold control for the CVVD startability securing control according to embodiments of the present disclosure.

Referring to FIG. 6, when the valve fails according to the occurrence of the CVVD error (S10), performing the valve position threshold control (S50) defines a threshold in which the valve duration does not exceed a predetermined value with respect to positions of the short/long durations and models a starting air volume on the basis of the valve duration threshold to map the modeled starting air volume to an air volume value of a level not affecting startability such that the startability is improved.

To this end, the CVVD controller 10 performs the valve position threshold control (S50) as a threshold application condition determination (S51), a valve duration threshold setting (S55), and a threshold-based cylinder charging amount calculation (S56).

Specifically, the threshold application condition determination (S51) includes a communication state checking (S52), a motor state checking (S53), and a valve position threshold checking (S54).

For example, the communication state checking (S52) checks whether abnormality of CAN communication, which is exhibited as a missing Hall sensor count, is present such that whether valve position recognition is possible is checked. As a result, when the valve position recognition is possible, a current valve position reference application (S52-1) is executed, whereas, when the valve position recognition is impossible, the communication state checking (S52) is switched to the motor state checking (S53). Therefore, the current valve position reference application (S52-1) implements the same function as the current valve position reference application (S42-1).

For example, the motor state checking (S53) checks possibility of valve movement through whether a motor is stuck, thereby determining whether the valve movement is possible even in a state in which the valve position recognition is impossible. As a result, when the valve movement is possible, a valve short direction movement (S53-1) is executed, whereas, when the valve movement is impossible, the motor state checking (S53) is switched to the valve position threshold checking (S54). Therefore, the valve short direction movement (S53-1) implements the same function as the valve short direction movement (S43-1).

For example, in a state in which the valve position recognition is impossible and the valve movement is impossible, the valve position threshold checking (S54) is performed by applying the following determination formula of valve position availability.

Determination formula of valve position availability: A>THD

Here, "A" is a valve position value detected or checked immediately before a failure, and "THD" is a valve position threshold which is capable of calculating an air volume so that these values are applicable to the cylinder charging amount Chrg_Ld (see FIG. 2), thereby not being limited to specific numerical values. Further, ">" is an inequality sign indicating a magnitude relationship between two values.

Thus, when a valve position value A immediately before a failure, which does not satisfy "A>THD," is less than a valve position threshold THD, a valve position reference air volume calculation immediately before a failure (S54-1) is executed such that, even when the valve position recognition is impossible and the valve movement is impossible, the CVVD control (S20) is performed by calculating an air volume using a valve duration value stored immediately before a failure when the failure occurs. Otherwise, when "A>THD" is satisfied, the CVVD controller 10 switches to the valve duration threshold setting (S55) and the threshold-based cylinder charging amount calculation (S56).

Specifically, owing to the occurrence of the CVVD error (S10) in which the valve position recognition is impossible, the valve movement is impossible, and application of the valve position threshold is impossible, the valve duration threshold setting (S55) applies a threshold, which is capable of securing startability and combustion stability apart from the short/long durations on the basis of a sensing count of the Hall sensor, to the valve duration and sets the threshold as the valve duration threshold.

Further, owing to the occurrence of the CVVD error (S10) in which the valve position recognition is impossible, the valve movement is impossible, and usage of the valve position value immediately before the failure is impossible, the threshold-based cylinder charging amount calculation (S56) applies a threshold to the valve duration and sets the threshold as the valve duration threshold.

Thus, the threshold-based cylinder charging amount calculation (S56) calculates a starting air volume and a starting fuel amount on the basis of the set valve duration threshold or more and applies the calculated starting air volume and the calculated starting fuel amount to an engine starting request, thereby performing the CVVD Control (S20). In this case, since the cylinder charging amount Chrg_Ld (see FIG. 2) is used in the calculation of the starting air volume and the starting fuel amount, the above calculation process is the same as the existing calculation process of the starting air volume and the starting fuel amount on the basis of the short/long durations.

Figure 7:
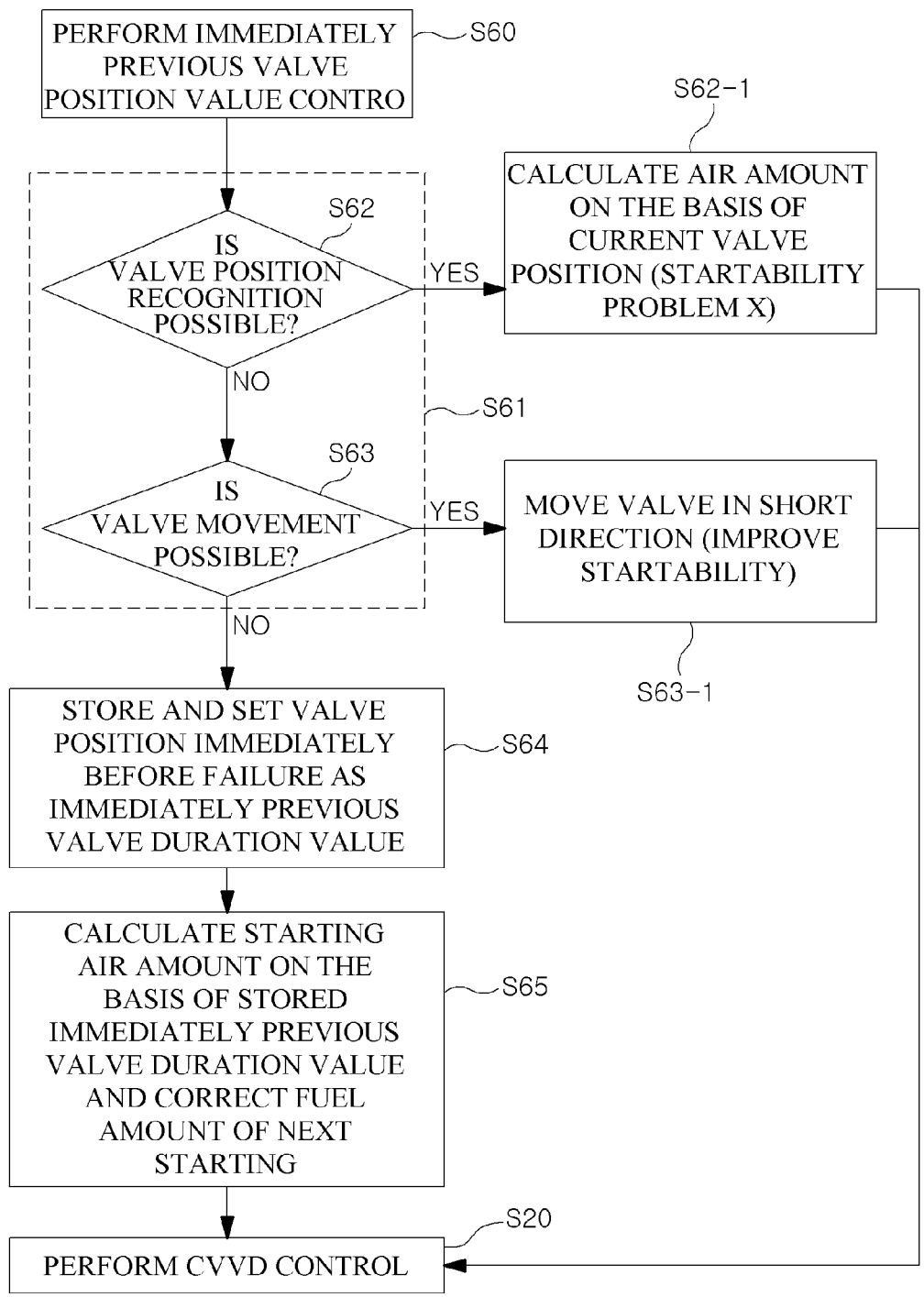
FIG. 7 is a flowchart illustrating immediately previous valve position value control for the CVVD startability securing control according to embodiments of the present disclosure.

Referring to FIG. 7, when the valve fails according to the occurrence of the CVVD error (S10), the immediately previous valve position value control (S60) defines an immediately previous value in which the valve duration is not out of the valve failure timing value or more with respect to positions of the short/long durations and models a starting air volume on the basis of the immediately previous valve duration value to map the modeled starting air volume to an air volume value of a level not affecting startability such that the startability is improved.

To this end, the CVVD controller 10 performs the immediately previous valve position value control (S60) as an immediately previous value application condition determination (S61), an immediately previous valve duration value setting (S64), and an immediately previous value-based cylinder charging amount correction (S65).

Specifically, the immediately previous value application condition determination (S61) includes a communication state checking (S62) and a motor state checking (S63).

For example, the communication state checking (S62) checks whether abnormality of CAN communication, which is exhibited as a missing Hall sensor count, is present such that whether valve position recognition is possible is checked. As a result, when the valve position recognition is possible, a current valve position reference application (S62-1) is executed, whereas, when the valve position recognition is impossible, the communication state checking (S62) is switched to the motor state checking (S63). Therefore, the current valve position reference application (S62-1) implements the same function as the current valve position reference application (S42-1).

For example, the motor state checking (S63) checks possibility of valve movement through whether a motor is stuck, thereby determining whether the valve movement is possible even in a state in which the valve position recognition is impossible. As a result, when the valve movement is possible, a valve short direction movement (S63-1) is executed, whereas, when the valve movement is impossible, since the occurrence of the CVVD error (S10) is the abnormality of the CAN communication or the Hall sensor failure and, simultaneously, is the motor failure, the CVVD controller 10 switches to the immediately previous valve duration value setting (S64) and the immediately previous value-based cylinder charging amount correction (S65).

Specifically, owing to the occurrence of the CVVD error (S10) in which the valve position recognition is impossible and the valve movement is impossible, the immediately previous valve duration value setting (S64) applies a stored immediately previous value, which is capable of securing startability and combustion stability, to the valve position immediately before a failure and sets the stored immediately previous value as the immediately previous valve duration value. The immediately previous value-based cylinder charging amount correction (S65) calculates a starting air volume as the set immediately previous valve duration value and calculates a starting fuel amount as a starting fuel correction amount for the next starting on the basis of the set immediately previous valve duration value. The immediately previous value-based cylinder charging amount correction (S65) applies the calculated starting air volume and a value of the calculated starting fuel correction amount to an engine starting request, thereby performing the CVVD control (S20).

In this case, since the cylinder charging amount Chrg_Ld (see FIG. 2) is used in the calculation of the starting air volume and the value of the calculated starting fuel correction amount, the above calculation process is the same as the existing calculation process of the starting air volume and the starting fuel amount on the basis of the short/long durations. However, the starting fuel correction amount sets an application range or an application area for the calculated value in consideration of startability of the engine. For example, during the next starting, the starting fuel correction amount solves cranking continuation in a manner in which a correction factor greater than 1 is applied to the starting fuel amount calculated by setting a limit so as to prevent a limp-home position or a valve position, which is used to recognize a fixed value of the valve position due to a valve failure, from being recognized to be greater than a predetermined value such that an air amount value of a level not affecting the startability is obtained. Further, the CVVD controller 10 may transmit a CAN bit with respect to the starting fuel correction amount to the data input device 20, thereby reflecting the starting fuel correction amount to a fuel injection flow rate for the combustion chamber 200-1 using an engine ECU function of the data input device 20.

Figure 8:
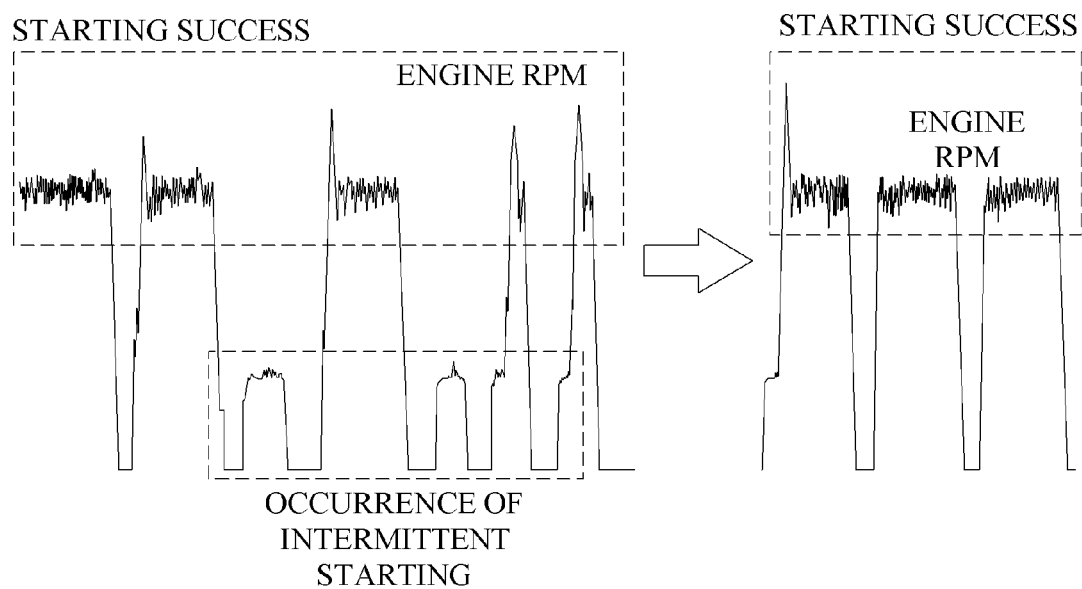
FIG. 8 is a diagram illustrating an example of verification in which engine startability is secured due to the CVVD startability securing control according to embodiments of the present disclosure.

Meanwhile, referring to a starting test result of FIG. 8, it can be seen that, when the CVVD error occurs (S10), an intermittent starting failure occurred together with a starting success with respect to a starting attempt in a left example of FIG. 8, but, when the CVVD error occurs (S10), the starting success is always achieved with respect to the starting attempt in a right test example of FIG. 8.

In this case, the left test result of FIG. 8 is an example in which the valve position fixing value control (S40), the valve position threshold control (S50), or the immediately previous valve position value control (S60) are applied to the CVVD system 1, and, this proves that, when the CVVD error occurs (S10), next startability of the engine is improved even through the CVVD control S20.

As described above, in accordance with the control method of securing CVVD startability according to the present embodiment, which is applied to the CVVD system 1, when the CVVD control is performed, the CVVD controller 10 checking the occurrence of the CVVD error can calculate a starting fuel amount in which the engine startability is maintained with respect to abnormality of the CAN communication between the systems, the stuck valve, or the motor failure, which is recognized as the CVVD error, by applying the starting air volume and the starting fuel amount by at least one of the valve position fixing value, the valve position threshold, and the immediately previous valve position value, as a cylinder charging amount required for engine re-starting. In particular, in a problematic situation in which the CVVD error occurs, the starting fuel amount is supplied to secure startability for the next starting such that vehicle mobility for an emergency response of a driver can be provided.

The control method of securing CVVD startability, which is applied to the CVVD system according to embodiments the present disclosure, implements the following actions and effects.

First, while a vehicle to which a CVVD is applied is driving, occurrence of a failure such as impossibility of CVVD position recognition or valve movement is handled as a CVVD error situation such that engine startability can be secured. Second, in a problematic situation of CVVD hardware including a failure of a CVVD actuator due to abnormality of CAN communication between a CVVD controller and an ECU, startability for the next starting can be provided such that safe vehicle movement is possible. Third, in the problematic situation, a correlation between a valve duration and a starting fuel amount is corrected such that the starting fuel amount is secured regardless of a fixed valve position and thus startability for the next starting can be provided. Fourth, the correction of the correlation between the valve duration and the starting fuel amount can be achieved by increasing the starting fuel amount according to an arbitrary setting value of the valve duration based on starting stability or correcting the starting fuel amount according to a duration criterion of a valve such that startability can be secured in various manners. Fifth, vehicle movement is maintained such that it is possible to significantly enhance a safety aspect so as to prevent a secondary accident in a situation of a component failure. Sixth, vehicle driving not requiring towing is maintained such that customer dissatisfaction can be resolved. Seventh, even when an operation of a CVVD system is shut down, an air amount required for an engine is provided such that malfunction, knocking, and starting off phenomena of the engine can be provided. Eighth, engine damage due to the knocking is prevented such that reduction in additional costs can be expected in terms of after service (AS) costs.

While the present disclosure has been described with respect to the specific embodiments, it will be apparent to those skilled in the art that various changes and modifications may be made without departing from the spirit and scope of the present disclosure as defined in the following claims. Accordingly, it should be noted that such alternations or modifications fall within the claims of the present disclosure, and the scope of the present disclosure should be construed on the basis of the appended claims.

What is claimed is:

1. A control method of securing continuously variable valve duration (CVVD) startability when a CVVD error is recognized by a CVVD controller during an operation of a CVVD system, the control method comprising:
    performing engine startability securing control for solving the CVVD error by applying a starting air volume to starting of an engine through at least one of a valve position fixing value, a valve position threshold, or an immediately previous valve position value, wherein performing the engine startability securing control comprises performing at least one of valve position fixing value control using the valve position fixing value, valve position threshold control using the valve position threshold, or immediately previous valve position value control using the immediately previous valve position value; and
    performing the valve position fixing value control, wherein performing the valve position fixing value control includes:
        determining an application condition with respect to the valve position fixing value by determining whether valve position recognition and valve movement are possible;
        setting the valve position fixing value to a valve duration fixing value when the valve position recognition is impossible and the valve movement is impossible; and
        calculating the starting air volume and a starting fuel amount based on the valve duration fixing value.

2. The control method of claim 1, wherein the valve position fixing value is a limp-home value of a valve position.

3. The control method of claim 1, wherein:
    when the valve position recognition is possible, the CVVD error is solved through a valve duration value based on a current valve position; and
    when the valve movement is possible, the CVVD error is solved through a valve short duration value.

4. The control method of claim 3, further comprising obtaining the valve short duration value at a position of a valve moved by a motor in a short direction.

5. The control method of claim 1, wherein the valve position threshold is a valve duration value not exceeding a predetermined value.

6. A control method of securing continuously variable valve duration (CVVD) startability when a CVVD error is recognized by a CVVD controller during an operation of a CVVD system, the control method comprising:
    performing engine startability securing control for solving the CVVD error by applying a starting air volume to starting of an engine through at least one of a valve position fixing value, a valve position threshold, or an immediately previous valve position value, wherein performing the engine startability securing control comprises performing at least one of valve position fixing value control using the valve position fixing value, valve position threshold control using the valve position threshold, or immediately previous valve position value control using the immediately previous valve position value; and performing the valve position threshold control, wherein performing the valve position threshold control includes:
- determining an application condition with respect to the valve position threshold by determining whether valve position recognition is possible, valve movement is possible, and application of the valve position threshold of a valve is possible;
- setting the valve position threshold as a valve duration threshold when the valve position recognition, the valve movement, and application of the valve position threshold are impossible; and
- calculating the starting air volume and a starting fuel amount based on the valve duration threshold.

7. The control method of claim 6, wherein:
when the valve position recognition is possible, the CVVD error is solved through a valve duration value based on a current valve position;
when the valve movement is possible, the CVVD error is solved through a valve short duration value; and
when the application of the valve position threshold is possible, the CVVD error is solved by the valve duration threshold.

8. The control method of claim 7, further comprising obtaining the valve short duration value at a position of the valve moved by a motor in a short direction.

9. The control method of claim 7, further comprising setting the valve position threshold smaller than a valve duration value of a valve position immediately before a failure.

10. A continuously variable valve duration (CVVD) system, comprising:
a CVVD controller configured to apply a starting air volume and a starting fuel amount by determining at least one of a valve position fixing value, a valve position threshold, or an immediately previous valve position value as a cylinder charging amount required for engine starting with respect to a CVVD error generated when CVVD control is performed,
wherein the CVVD controller includes a valve position map and a fuel amount map;
wherein the valve position map is configured to match the valve position fixing value, the valve position threshold, and the immediately previous valve position value; and
wherein the fuel amount map is configured to match the starting fuel amount to the starting air volume.

11. The CVVD system of claim 10, wherein the CVVD error includes at least one of abnormality of controller area network (CAN) communication, a stuck valve, or a motor failure.

12. The CVVD system of claim 10, wherein:
the CVVD controller includes a cylinder charging amount map; and
the cylinder charging amount map is configured to match a duration value of a valve to the cylinder charging amount.

13. The CVVD system of claim 10, wherein the CVVD controller is connected to a mass air flow (MAF) sensor configured to detect an air flow rate of an intake line.

14. The CVVD system of claim 10, wherein the CVVD controller is connected to a continuously variable valve timing (CVVT) system configured to directly control a camshaft.

* * * * *